(12) United States Patent
Cheng et al.

(10) Patent No.: US 11,125,277 B2
(45) Date of Patent: Sep. 21, 2021

(54) TYPE OF CONSTANT VELOCITY UNIVERSAL JOINT WITH THE SPLINE SLIP STRUCTURE

(71) Applicant: Zhejiang CFMOTO Power Co., Ltd., Zhejiang (CN)

(72) Inventors: Fuying Cheng, Hangzhou (CN); Zhenxiang Kuang, Hangzhou (CN); Jiajun Li, Hangzhou (CN)

(73) Assignee: Zhejiang CFMoto Power Co., Ltd., Zhejiang (CN)

( * ) Notice: Subject to any disclaimer, the term of this patent is extended or adjusted under 35 U.S.C. 154(b) by 541 days.

(21) Appl. No.: 16/039,687

(22) Filed: Jul. 19, 2018

(65) Prior Publication Data
US 2019/0078623 A1    Mar. 14, 2019

(30) Foreign Application Priority Data

Jul. 19, 2017 (CN) .......................... 201720880127.6
Jul. 19, 2017 (CN) .......................... 201720880153.9

(51) Int. Cl.
*F16D 3/223*     (2011.01)
*F16D 3/06*      (2006.01)
*F16D 3/2245*    (2011.01)

(52) U.S. Cl.
CPC ............... *F16D 3/223* (2013.01); *F16D 3/06* (2013.01); *F16D 3/2245* (2013.01); *F16D 2003/22313* (2013.01); *Y10T 403/7033* (2015.01)

(58) Field of Classification Search
CPC .......... F16D 3/06; F16D 3/223; F16D 3/2245; F16D 3/227; F16D 2003/22313; F16D 2003/2232; F16D 2003/232323; F16D 2003/22326; F16D 2003/22323; Y10S 464/906; Y10T 403/7026; Y10T 403/7033; Y10T 403/7035
USPC ........ 403/359.1, 359.5, 359.6; 464/143, 162, 464/906
See application file for complete search history.

(56) References Cited

U.S. PATENT DOCUMENTS

| 2,987,897 | A | 6/1961 | Spence |
| 3,218,827 | A | 11/1965 | Aucktor |
| 3,442,095 | A | 5/1969 | Devos |

(Continued)

FOREIGN PATENT DOCUMENTS

| JP | 06193642 A | 7/1994 |
| WO | 2006080132 A1 | 8/2006 |

(Continued)

*Primary Examiner* — Josh Skroupa
(74) *Attorney, Agent, or Firm* — Jeffrey D. Shewchuk; Shewchuk IP Services, LLC

(57) ABSTRACT

A type of constant velocity universal joint has the spline slip structure, including the steel wire retaining ring and the star-shaped sleeve which are both mounted on a common axis, and the steel wire retaining ring limiting device. The said steel wire retaining ring limiting device is a groove arranged on the said star-shaped sleeve and used for holding the said steel wire retaining ring. The said steel wire retaining ring may be elliptic or circular. The movement in the radial direction of the steel wire retaining ring will be limited by the groove on the star shaped sleeve and there occurs a certain contraction, in addition to appropriate the chamfer angle of the groove, when removing the spline shaft from the star-shaped sleeve.

5 Claims, 3 Drawing Sheets

(56) References Cited

U.S. PATENT DOCUMENTS

| | | | |
|---|---|---|---|
| 3,464,232 A | 9/1969 | Hutchinson | |
| 3,789,626 A * | 2/1974 | Girguis | F16D 3/226 464/146 |
| 4,068,499 A | 1/1978 | Sharp | |
| 4,511,346 A | 4/1985 | Hazebrook et al. | |
| 4,573,947 A | 3/1986 | Hazebrook et al. | |
| 4,838,832 A | 6/1989 | Schmitt et al. | |
| 4,909,774 A * | 3/1990 | Muller | B60K 17/22 464/146 |
| 5,624,318 A * | 4/1997 | Jacob | F16D 3/065 464/140 |
| 5,647,801 A * | 7/1997 | Jacob | F16D 3/223 464/145 |
| 5,692,961 A * | 12/1997 | Turner | F16D 3/227 464/146 |
| 6,306,045 B1 * | 10/2001 | Jacob | F16C 3/035 464/167 |
| 6,443,844 B1 | 9/2002 | Perrow | |
| 6,582,313 B2 | 6/2003 | Perrow | |
| 7,077,753 B2 * | 7/2006 | Kuczera | F16D 3/223 464/144 |
| 7,311,167 B2 | 12/2007 | Takayanagi et al. | |
| 7,614,818 B2 | 11/2009 | Gutierrez et al. | |
| 8,066,575 B2 | 11/2011 | Kobayashi | |
| 8,197,349 B2 * | 6/2012 | Terada | F16D 3/227 464/182 |
| 8,371,767 B2 * | 2/2013 | Uhl | F16B 7/182 403/46 |
| 8,388,457 B2 * | 3/2013 | Keller | F16D 3/223 464/146 |
| 8,403,764 B2 | 3/2013 | Kobayashi | |
| 8,425,142 B2 * | 4/2013 | Disser | F16D 1/116 403/359.5 |
| 8,499,457 B2 | 8/2013 | Kobayashi et al. | |
| 8,512,157 B2 | 8/2013 | Harada et al. | |
| 8,556,737 B2 * | 10/2013 | Yamauchi | B60B 27/0094 464/178 |
| 8,771,092 B2 | 7/2014 | Fuhio | |
| 8,864,591 B2 * | 10/2014 | Sugiyama | F16C 1/04 464/173 |
| 9,611,897 B2 * | 4/2017 | Edwards | F16D 3/223 |
| 10,253,819 B2 * | 4/2019 | Sherlock | F16B 21/18 |
| 2012/0172137 A1 | 7/2012 | Yamazaki et al. | |

FOREIGN PATENT DOCUMENTS

| | | |
|---|---|---|
| WO | 2007090429 A1 | 8/2007 |
| WO | 2009037936 A1 | 3/2009 |

* cited by examiner

TYPE OF CONSTANT VELOCITY UNIVERSAL JOINT WITH THE SPLINE SLIP STRUCTURE

CROSS-REFERENCE TO RELATED U.S. APPLICATION(S)

None.

FIELD OF THE INVENTION

The present invention relates to the technical field of universal joint, particularly to a type of constant velocity universal joint with the spline slip structure.

BACKGROUND OF THE INVENTION

The steel wire retaining ring is arranged on the constant velocity universal joint with the spline slip structure, and it can be moved in the radial direction under the free state; so it is very difficult for maintenance and disassembling, and it is possible to cut off the retaining ring before it can be removed, or even the retaining ring is unable to be removed normally.

Therefore, how to provide a type of constant velocity universal joint with the spline slip structure to facilitate removing the spline shaft from the star-shaped sleeve is technical defect which urgently need to be solved for those skilled in the art.

BRIEF SUMMARY OF THE INVENTION

In view of this, the purpose of the present invention is to provide a type of constant velocity universal joint with the spline slip structure to facilitate removing the spline shaft from the star-shaped sleeve.

In order to achieve the above object, the present invention provides the following technical schemes:

A type of constant velocity universal joint with the spline slip structure includes the steel wire retaining ring and the star-shaped sleeve which are both mounted on a common axis, and the steel wire retaining ring limiting device. The said steel wire retaining ring limiting device is a groove arranged on the said star-shaped sleeve for holding the said steel wire retaining ring. The said steel wire retaining ring is circular in one embodiment and elliptic in another embodiment.

Preferably, the above groove is provided with the chamfer angle.

Preferably, the above groove is the arc groove.

Preferably, the above groove is the L-shaped groove.

Preferably, the above groove is formed by the horizontal plane and the inclined plane.

A type of constant velocity universal joint with the spline slip structure provided by the present invention includes the steel wire retaining ring and the star-shaped sleeve which are both mounted on a common axis, and the steel wire retaining ring limiting device. The said steel wire retaining ring limiting device is a groove arranged on the said star-shaped sleeve for holding the said steel wire retaining ring. The said steel wire retaining ring is circular in one embodiment and elliptic in another embodiment. The movement in the radial direction of the steel wire retaining ring will be limited by the groove on the star-shaped sleeve and there occurs a certain contraction, in addition to appropriate the chamfer angle of the groove, so it is very convenient to remove the spline shaft from the star-shaped sleeve.

BRIEF DESCRIPTION OF THE DRAWINGS

In order to describe the technical scheme more clearly in the existing technology or the embodiment of the present invention, the drawings required for the implementation of the existing technology or the embodiment of the present invention are briefly introduced in the following, obviously, the drawings below are some embodiments of the present invention, for the ordinary technical personnel in the art, you can also get other drawings according to these drawings at the premise of without giving creative labor.

FIGS. 1-3: The star-shaped sleeve 1, the groove 2, the steel wire retaining ring 3, the chamfer angle 4.

DETAILED DESCRIPTION OF THE PREFERRED EMBODIMENTS

To make the purpose, technical scheme and advantages of the embodiment of the present invention more clear, technical scheme of the embodiment of the present invention is clearly and completely described in the following combined with the accompanying drawings of the embodiment of the present invention; obviously, the embodiment of the present invention is a part of the embodiments, not all of the embodiments of the present invention. Based on the embodiment of the present invention, all other embodiments which the ordinary technical personnel in the art obtain at the premise of without giving creative labor are also deemed to fall into the protection scope of the present invention.

Figure 1:
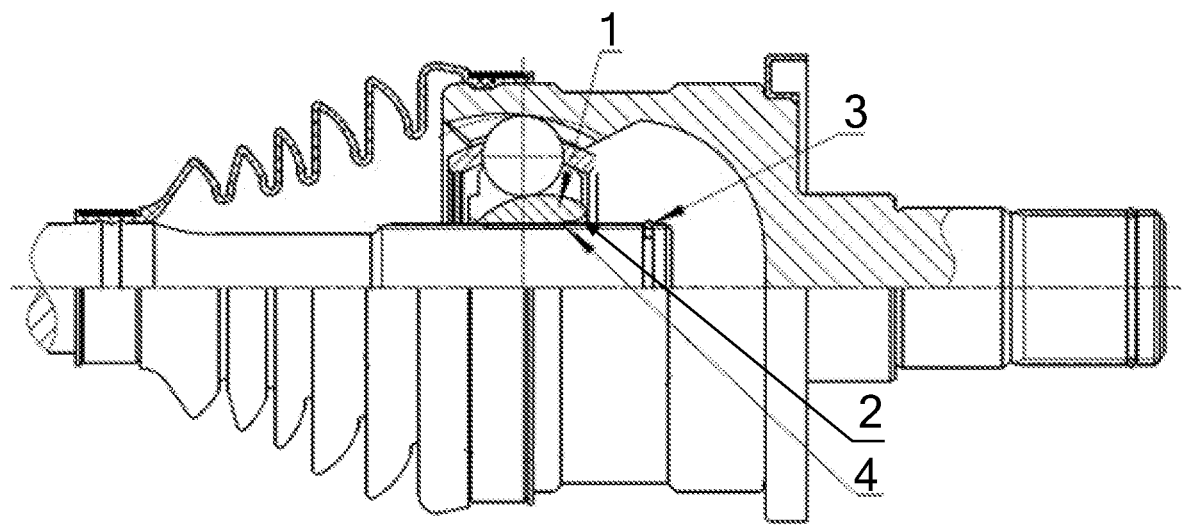
FIG. 1 is the schematic view showing the structure of the steel wire retaining ring being arranged on the constant velocity universal joint with the spline slip structure provided by the embodiment of the present invention.
Figure 2:
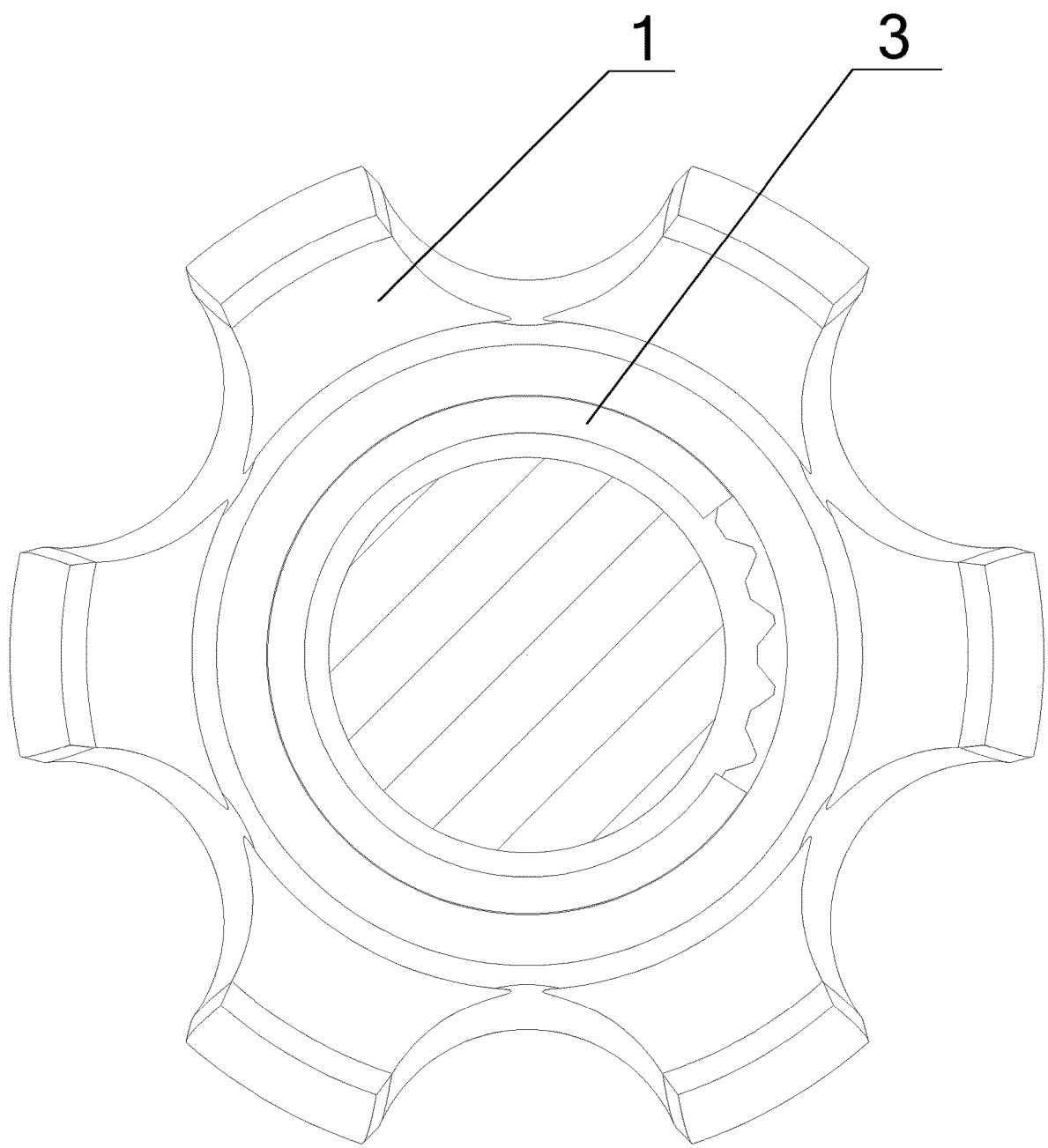
FIG. 2 is the side schematic view showing the structure of the steel wire retaining ring being arranged on the constant velocity universal joint with the spline slip structure provided by the circular embodiment of the present invention.
Figure 3:
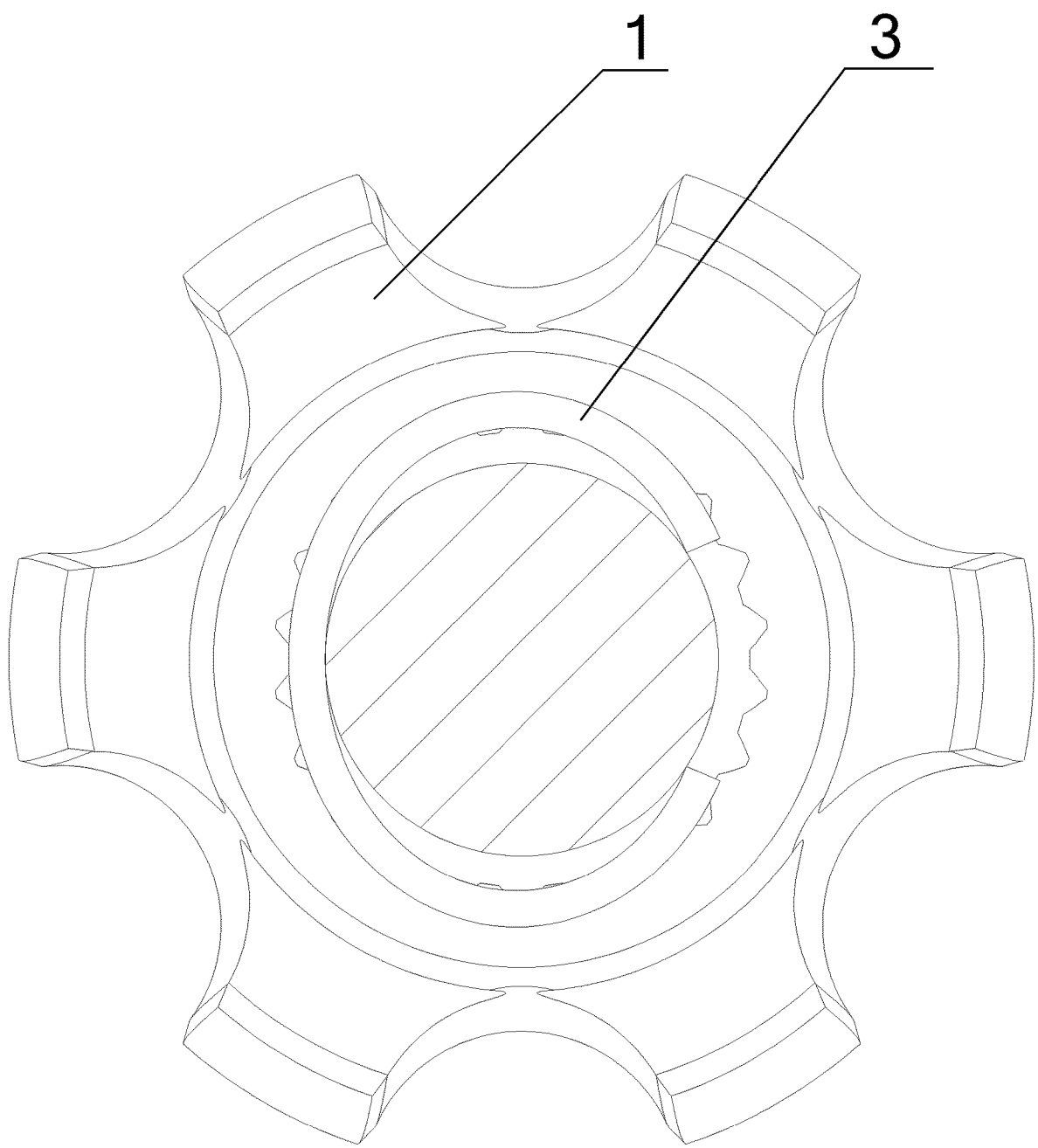
FIG. 3 is the side schematic view showing the structure of the steel wire retaining ring being arranged on the constant velocity universal joint with the spline slip structure provided by the elliptic embodiment of the present invention.

Referring to FIGS. 1-3. FIG. 1 is the schematic view showing the structure of the steel wire retaining ring being arranged on the constant velocity universal joint with the spline slip structure provided by the embodiment of the present invention. FIG. 2 is the side schematic view showing the structure of the steel wire retaining ring being arranged on the constant velocity universal joint with the spline slip structure provided by the circular embodiment of the present invention. FIG. 3 is the side schematic view showing the structure of the steel wire retaining ring being arranged on the constant velocity universal joint with the spline slip structure provided by the elliptic embodiment of the present invention.

A type of constant velocity universal joint with the spline slip structure provided by the present invention includes the steel wire retaining ring 3 and the star-shaped sleeve 1 which are both mounted on a common axis, and the steel wire retaining ring limiting device. The steel wire retaining ring limiting device is a groove 2 arranged on the star-shaped sleeve 1 for holding the steel wire retaining ring 3. The steel wire retaining ring 3 is circular in the first embodiment and elliptic in the second embodiment. The movement in the radial direction of the steel wire retaining ring 3 will be limited by the groove 2 on the star-shaped sleeve 1 and there occurs a certain contraction, in addition to appropriate the chamfer angle of the groove, so it is very convenient to remove the spline shaft from the star-shaped sleeve.

Further optimization of the above technical scheme, the groove 2 is provided with chamfer angle 4, so it is more convenient for disassembling. Wherein, the groove 2 can be the arc groove or L-shaped groove. Of course, the groove 2 can also be formed by the horizontal plane and the inclined plane.

The above descriptions of the disclosed embodiment enable professional and technical personnel in the art to achieve or use the present invention. Obviously, the professional and technical personnel in the art will make a plurality of modifications to these embodiment, the general principles defined in this article may be achieve in the other embodiment without departing from the spirit or essential attributes of the present invention. Therefore, this invention will not be limited to the embodiment shown in this article, but to conform to the maximum extent of principles and new features that are disclosed in this article.

The invention claimed is:

1. A constant velocity universal joint with a spline slip structure, comprising:
    a spline shaft having one or more splines facing outwardly about a spline shaft axis;
    a star-shaped sleeve including an inner surface capable of engaging with the spline shaft and allowing the spline shalt to slide axially within the star-shaped sleeve while transmitting torque between the one or more splines and the star-shaped sleeve during working of the constant velocity universal joint; and
    a circular steel wire retaining ring mounted on the spline shaft in an axial position where the circular steel wire retaining ring does not contact the star-shaped sleeve during working of the constant velocity universal joint;
wherein a limiting device for the steel wire retaining ring is provided as a groove arranged on an end of the star-shaped sleeve facing the circular steel wire retaining ring during working of the constant velocity universal joint, the groove being used for holding the circular steel wire retaining ring when the spline shaft is pulled by an external force to disassemble the constant velocity universal joint; and
wherein a chamfer angle is arranged on the groove for connecting the inner surface and the groove, the chamfer angle being capable of guiding the circular steel wire retaining ring and compressing the circular steel wire retaining ring inwardly toward the spline shaft axis when the spline shaft is pulled by an external force to disassemble the star shaped sleeve from the spline shaft.

2. The constant velocity universal joint according to claim 1, wherein the groove, when viewed in cross-section with the spline shall axis horizontal, is formed by a horizontal linear portion extending from the chamfer angle and an inclined linear portion extending from the horizontal linear portion.

3. A constant velocity universal joint with a spline slip structure, comprising:
    a spline shaft having one or more splines facing outwardly about a spline shaft axis;
    a star-shaped sleeve including an inner surface capable of engaging with the spline shaft and allowing the spline shaft to slide axially within the star-shaped sleeve while transmitting torque between the one or more splines and the star-shaped sleeve during working of the constant velocity universal joint; and
    a steel wire retaining ring mounted on the spline shaft in an axial position where the steel wire retaining ring does not contact the star-shaped sleeve during working of the constant velocity universal joint;
wherein a limiting device for the steel wire retaining ring is provided as a groove arranged on an end of the star-shaped sleeve facing the steel wire retaining ring during working of the constant velocity universal joint, the groove being used for holding the steel wire retaining ring when the spline shaft is pulled by an external force to disassemble the constant velocity universal joint; and
Wherein the steel wire retaining ring is elliptic when viewed in an axial direction.

4. The constant velocity universal joint according to claim 3, wherein a chamfer angle is arranged on the groove for connecting the inner surface and the groove, the chamfer angle being capable of guiding the steel wire retaining ring and compressing the steel wire retaining ring inwardly toward the spline shaft axis when the spline shaft is pulled by an external force to disassemble the star shaped sleeve from the spline shaft.

5. The constant velocity universal joint according to claim 3, wherein the groove, when viewed in cross-section with the spline shaft axis horizontal, is formed by a horizontal linear portion extending from the chamfer angle and an inclined linear portion extending from the horizontal linear portion.

* * * * *

UNITED STATES PATENT AND TRADEMARK OFFICE
CERTIFICATE OF CORRECTION

| | |
|---|---|
| PATENT NO. | : 11,125,277 B2 |
| APPLICATION NO. | : 16/039687 |
| DATED | : September 21, 2021 |
| INVENTOR(S) | : Cheng et al. |

It is certified that error appears in the above-identified patent and that said Letters Patent is hereby corrected as shown below:

In the Claims

At Column 3, Line 29, delete "shalt" and insert therefor --shaft--.

At Column 4, Line 6, delete "shall" and insert therefor --shaft--.

At Column 4, Line 31, delete "Wherein" and insert therefor --wherein--.

Signed and Sealed this
Twenty-third Day of August, 2022

*Katherine Kelly Vidal*

Katherine Kelly Vidal
*Director of the United States Patent and Trademark Office*